United States Patent [19]
Smetana et al.

[11] Patent Number: 5,294,255
[45] Date of Patent: Mar. 15, 1994

[54] PUMPABLE BACKFILL GROUT

[75] Inventors: David A. Smetana; Richard J. Lenczewski; Alfonzo L. Wilson, all of Cleveland, Ohio

[73] Assignee: Specrete-IP Incorporated, Cleveland, Ohio

[21] Appl. No.: 949,435

[22] Filed: Sep. 23, 1992

[51] Int. Cl.⁵ .................. C04B 14/08; C04B 14/18
[52] U.S. Cl. ..................... 106/698; 106/675; 106/705; 106/706; 106/708; 106/719; 106/DIG. 2; 252/378 P; 405/266
[58] Field of Search ............ 106/675, 677, 698, 705, 106/706, 708, 709, 718, 719, 724, 738, 820, 823, DIG. 1, DIG. 2; 252/378 P; 405/266, 267

[56] References Cited

U.S. PATENT DOCUMENTS 4,419,135  12/1983  Hoge ........................... 106/678
5,114,617   5/1992  Smetana et al. ............ 106/DIG. 2

Primary Examiner—Mark L. Bell
Assistant Examiner—M. Marcheschi
Attorney, Agent, or Firm—Pearne, Gordon, McCoy & Granger

[57] ABSTRACT

A pumpable backfill grout which hardens into a controlled low strength material and an additive for making up such a backfill grout. The grout consists essentially of portland cement, a smooth surfaced vesicular expanded perlite, fly ash, fine aggregate, water, an air entraining agent, a quick dispersing thixiotropic suspending agent and a bentonite thickening agent.

8 Claims, No Drawings

PUMPABLE BACKFILL GROUT

BACKGROUND OF THE INVENTION

This invention relates to low strength concrete compositions to be used as back fill grouts. These compositions are capable of solidifying into inexpensive, low strength materials for back filling excavations where it is desirable to avoid subsidence of the back filled materials subsequent to the back filling operation. They are pumpable with sufficient viscosity to remain free of settling out or separation of components during pumping, and are of low enough viscosity to take advantage of the void-filling capability of the grout.

As is known in the art, an admixture is a material other than hydraulic cement, water, fiber reinforcement or aggregates which is used as an ingredient of concrete or mortar and is added to the batch immediately before or during its mixing or use. Admixtures are used to modify the properties of concrete or grout in such a way as to make it more suitable for a particular purpose or for economy. Using an admixture should allow the employment of less expensive construction methods or designs or achieve new results and thereby offset the costs of the admixture. U.S. Pat. No. 4,961,790 discloses additional information regarding admixtures generally, and is hereby incorporated by reference.

The present invention concerns the use of an admixture for increasing the viscosity of a cementitious grout or blend containing a high proportion of aggregate and a very low proportion of cement which, without the admixture, would be of very limited use due to the settling of the aggregate from the mixture.

One material commonly used to fill cavities is referred to as CLSM, Controlled Low Strength Material. This material can be discharged from the chute of a ready mix truck directly into the cavity to be filled, whereupon the material will set into a low strength concrete useful for filling cavities resulting from excavation operations. When such a cavity is inaccessible by truck or where it is necessary for the material to flow or be pumped over some distance to its final destination, CLSM material presents difficulties and generally can not be used due to separation and settling out of the aggregate contained in such mixtures.

SUMMARY OF THE INVENTION

The present invention relates to a novel pumpable cementitious mixture of the CLSM type which is hardenable into a low-strength concrete particularly useful as an inexpensive back fill grout, which is especially useful in applications where subsequent subsidence of the back filled volume must be prevented, and in which the avoidance of settlement or separation of components is important. The particular advantage of the mixture is that it is pumpable and thereby useful in certain applications in which sufficient viscosity to prevent separation and settling out of the aggregate is very important, but in which an inexpensive mixture is also required. The novel aspects of this mixture include a relatively smooth-surfaced, vesicular, expanded perlite, which is relatively hard and not friable, but which has low density so that it floats in water, and is of a fine grain size, intermediate that of normally used aggregates and that of dry cements and an air entraining agent, diatomaceous earth, a thickening agent, and a dispersant.

The present invention further relates to a novel blend of components for an admixture to be added to a CLSM to attain the desired characteristics of pumpability and suspension stability. The addition of said admixture to a CLSM enables the CLSM blend of materials to be pumped into place. The admixture of the present invention provides lateral flow with excellent mobility a stable, homogenous mixture, volume stability with less than 1% bleeding, and an increase of approximately 16% in yield.

DESCRIPTION OF THE PREFERRED EMBODIMENTS

The cementitious composition of the present invention contains, based on the wet grout or cementitious mixture, from about 0.01 to 10 percent by weight of a relatively smooth-surfaced, vesicular, expanded perlite of from about 100 to 30 mesh in size, with a bulk density of from about 7 to 20 pounds per cubic foot. It is relatively hard and not friable. It does not disintegrate when used as an aggregate and mixed with cement and other aggregates.

This material is described in U.S. patent application Ser. No. 07/571,549, filed Aug. 24, 1990, now U.S. Pat. No. 5,114,617. It is available from Specrete-IP Incorporated of 10703 Quebec Avenue, Cleveland, Ohio 44106.

A key characteristic of this expanded perlite is that it does not segregate when blended and shipped with other dry materials, and it resists degradation when blended with other materials. This result is in contrast to the performance of the prior art expanded perlite, which tends to segregate and degrade when mixed with other materials.

Another key characteristic of this expanded perlite is that, by weight, over 60% of it floats in water. By volume, most of it floats in water and only a small portion sinks in water.

In addition, as will be hereinafter described, the cementitious composition, of this invention contains an air entraining agent, diatomaceous earth, a thickening agent, and a dispersant or surface active agent.

Table I lists several formulations for presently known and employed prior art controlled low-strength materials (CLSM). These CLSM formulations are believed to be typical or representative of the formulations used and strengths produced when used in applications calling for a low-strength concrete material, e.g., with design strengths in compression ranging from 50 to 1000 psi. All of the following design strengths are for strengths in compression.

TABLE I

| Typical CLSM Mix Proportions | | | | |
|---|---|---|---|---|
| Design Strength, psi | 50 | 100 | 500 | 1000 |
| Cement, lb. | 60 | 100 | 190 | 280 |
| Fly Ash, lb. | 290 | 300 | 300 | 300 |
| Fine Aggregate, lb. | 2770 | 2700 | 2680 | 2650 |
| Water, lb. | 475 | 465 | 460 | 440 |

The mixes of Table I above can be poured or placed into a cavity. The placement, however, must be continuous or subsidence will take place. It will become immobile and it will not be possible to move the material further into the cavity. If you want to turn a typical CLSM mix into a flowable motar, you have to add more water. By a "flowable motar", it is meant that the material will not become immobile as it is being poured or placed even though, after it has been poured or otherwise placed, it may subside. By "subside", it is meant that the solids separate out from the liquid leaving a liquid layer and a layer of mixed solids.

A flowable 100 p.s.i. design strength CLSM mortar mix is as follows:

TABLE II

| Design Strength, psi | 100 |
|---|---|
| Cement, lb | 100 |
| Fly Ash Aggregate, lb | 300 |
| Fine Aggregate, lb | 2600 |
| Water, lb | 584 |

While the above mix is flowable, it is still not pumpable in the conventional sense and it still subsides.

By the use of a small amount of the admixture of my invention, however, a 100 p.s.i. design strength pumpable grout can be made as follows:

TABLE III

| PUMPABLE BACK FILL GROUT | |
|---|---|
| Design Strength, psi | 100 |
| Cement, lb | 100 |
| Fly Ash, (C), lb | 300 |
| Fine Aggregate, lb | 2600 |
| Expanded perlite additive (Table VI) | 8 |
| Water | 485 |

The Table III pumpable CLSM formulation provides a design strength of 100 psi, as does the flowable mortar formulation shown in Table II. The formulations are similar in amount of cement, fly ash and fine aggregate employed. The pumpable back fill formulation grout has less water. However, as shown in Table IV below, significant differences exist in the physical properties of the material thus formed. The volume is considerably larger in the pumpable back fill grout of the present invention, and consistently therewith the density of this material is much lower. The laboratory observations, shown also in Table IV, clearly demonstrate the physical and functional differences between the two formulations.

TABLE IV

| CONTROLLED LOW STRENGTH MATERIAL | | |
|---|---|---|
| | Prior Art CLSM (Table II) | Present Invention CLSM (Table III) |
| Design Stength, psi | 100 | 100 |
| Yield, ft³ | 27.5 | >32.0 |
| W/C + FA Rati | 1.46 | 1.21 |
| Wet Density, lb/ft³ | 138 | 105 |
| Laboratory Observations | | |
| Pumping Characteristics | Placeable, but problematic | Homogenous Mixture - Readily pumped |
| Mobility/ Lateral Flow | None | 35-40 sec./ ½" flow cone |
| Subsidence/ Settlement | Substantial/ Rapid | <1% in one hour |
| Volume Stability | Settlement/ Bleeding | Maintains >99% Measured Volume |
| Fluidifying Admixture | Increased Subsidence | |

Of particular interest and concern in the present invention is the difference in pumpability. The CLSM back fill grout of the present invention greatly increases the viscosity of the mixture, allowing the material to be easily pumped over considerable distances with no danger of settling out of suspended aggregate during the pumping process, thus greatly improving the pumping characteristics over the prior art. The mobility/lateral flow test of Table IV, refers to the time taken for the mortar admixture to flow through a cone having a one-half inch orifice. The prior art flowable mortar could not be measured due to the fact that the water rapidly separated out from the solids and the solids blocked the orifice. As noted, subsidence or settlement and volume stability refer to the propensity of the solids of the mortar to settle out and expell the water. As clearly shown in Table IV, the pumpable back fill grout of the invention is superior in these respects as well.

The fact that the expanded perlite of the invention has a smooth surface which is nearly sealed, and over 60% of it by weight floats in water, accounts primarily for the differences in volume and density of these two 100 p.s.i. design strength formulations as shown in Table IV.

The other factor is the entrainment of air brought about by the addition of an air entrainment agent. This helps in placing the grout and prevents the loss of volume from loss of water caused by subsidence.

Table V below gives typical ranges of weights of the ingredients in an expanded perlite additive formulation. These ranges are useful for producing pumpable back fill grouts having various characteristics, but all within the scope of the invention.

TABLE V

| Expanded Perlite Additive Formulation for Back Fill Grout | |
|---|---|
| Material | Parts by Weight, lb |
| Expanded perlite | 500-1200 |
| Air Entraining Agent | 100-200 |
| Diatomaceous earth | 25-75 |
| Quick dispersing thixotropic suspending agent | 25-75 |
| Bentonite thickening agent | 10-35 |
| Dispersant | 10-35 |

The preferred air entraining agent is Vinsol Resin NVX 20% neutralized solution. This is an extract from southern pine stump wood. It is a dark high melting thermoplastic resin which has been reacted with alkalis to neutralize it and produce water soaps. It is manufactured by the Hercules Powder Company of Wilmington, Del. Other suitable air entraining agents are DARAVAIR and DAREX sold by Grace Concrete Products of Chicago, Ill. These air entraining agents comply with ASTM Designation 260.

The preferred diatomaceous earth is Dicalite. This is produced by Grefco, Inc. of Torrence, Calif.

The preferred quick dispersing thixotropic suspending agent is Cellosize QP 4400H. This is a hydroxy ethyl cellulose manufactured by Union Carbide Chemicals and Plastics of Bound Brook Company, N.J. Other quick dispersing thixotropic suspending agents are CARBOPOL 801 sold by BF Goodrich of Cleveland, Ohio, and STYMER S sold by Monsanto Chemical Company of Saint Louis, Mo. CARBOPOL 801 is a polyacrylic acid powder. STYMER S is a sodium salt of a styrene-maleic anhydride copolymer.

The term "dispersant" is intended to cover surface active agents which, when added to water, promote uniform and maximum separation of extremely fine solid particles. For the most part, they are polymeric electrolytes.

The preferred bentonite thickening agent is Quick Gel Bentonite manufactured by Barold Drilling Fluids of Houston, Tex. It is both a viscosifier and thickening agent. This bentonite is preferred because it is quick wetting. Other bentonites may be used if they have suitable wetting characteristics. When properly dispersed and wetted, the bentonite also has thixiotropic effects. It is not, however, quick dispersing.

The preferred dispersant or surface active agent is Weschem CA-1 calcium lignosulfonate. This is manufactured by Wesco Technologies Ltd. of San Clemente, Calif. It is a refined calcium lignosulfonate powder.

Small amounts of sodium hexametaphosphate may be used as a dispersant. Superplasticizer powders such as BOREM 100 HP sold by Boremco Specialty Chemical of Fall River, Mass., may be used as a disperant. The superplasticizers tend to be expensive.

The preferred formulation for the backfill grout additive of my invention is given in Table VI below.

TABLE VI

Back Fill Grout Additive Formulation

| Material | Weight, lb |
|---|---|
| Expanded perlite | 850 |
| Vinsol Resin (20%) | 155 |
| Diatomite | 50 |
| Cellosize QP4400H | 50 |
| Quick Gel Bentonite | 25 |
| Wesco CA 1 (Calcium Lignosulfonate) | 25 |

A typical backfill grout wet mix formulation, ready to be pumped, is as follows:

| Ingredient | Parts by Weight |
|---|---|
| portland cement | 60-300 |
| fly ash | 250-350 |
| fine aggregate | 2500-3000 |
| water | 400-700 |
| smooth surfaced vesicular expanded perlite | 3-15 |
| air entraining agent | .6-1.2 |
| diatomaceous earth | .15-.45 |
| quick dispersing thixotropic suspending agent | .15-.45 |
| bentonite thickening agent | .06-.2 |
| dispersant | .06-.2 |

While some of the benefits of the present invention may be obtained with open-surfaced vesicular expanded perlite, such as PERMALITE, sold by Chemrock Corporation of Nashville, Tenn., it is not the preferred material. The particles are larger than the smooth surface expanded perlite, they are not as hard and they are more friable. In an additive formulation, such as Table V, when shipped, they may separate.

While the invention has been shown and described with respect to particular embodiments thereof, the examples are for the purpose of illustration rather than limitation, and other variations and modifications of the specific embodiments herein described will be apparent to those skilled in the art all within the intended spirit and scope of the invention. Accordingly, the invention is not to be limited in scope and effect to the specific embodiment herein described, nor in any other way that is inconsistent with the extent to which the progress in the art has been advanced by the invention.

What we claim is:

1. An additive for a pumpable backfill grout consisting essentially of

| Material | Parts by Weight |
|---|---|
| vesicular expanded perlite | 500-1200 |
| air entraining agent | 100-200 |
| diatomaceous earth | 25-75 |
| quick dispersing thixiotropic suspending agent | 25-75 |
| bentonite thickening agent | 10-35 |
| dispersant | 10-35. |

2. An additive for a pumpable backfill grout consisting essentially of

| Material | Parts by Weight |
|---|---|
| vesicular expanded perlite | 500-1200 |
| air entraining agent | 100-200 |
| diatomaceous earth | 25-75 |
| quick dispersing hydroxy ethyl cellulose thixiotropic suspending agent | 25-75 |
| bentonite thickening agent | 10-35 |
| calcium lignosulfonate | 10-35. |

3. A pumpable backfill grout consisting essentially of, parts by weight,

| | |
|---|---|
| portland cement | 60-300 |
| fly ash | 250-350 |
| fine aggregate | 2500-3000 |
| water | 400-700 |
| vesicular expanded perlite | 3-15 |
| air entraining agent | .6-1.2 |
| diatomaceous earth | .15-.45 |
| quick dispersing thixiotropic suspending agent | .15-.45 |
| bentonite thickening agent | .06-.2 |
| dispersant | .06-.2. |

4. A pumpable backfill grout consisting essentially of, parts by weight,

| | |
|---|---|
| portland cement | 60-300 |
| fly ash | 250-350 |
| fine aggregate | 2500-3000 |
| water | 400-700 |
| vesicular expanded perlite | 3-15 |
| air entraining agent | .6-1.2 |
| diatomaceous earth | .15-.45 |
| quick dispersing hydroxyethyl cellulose thixiotropic suspending agent | .15-.45 |
| bentonite thickening agent | .06-.2 |
| caclium lignosulfonate dispersant | .06-.2. |

5. An additive for a pumpable backfill grout consisting essentially of

| Material | Parts by Weight |
|---|---|
| smooth surfaced vesicular expanded perlite | 500-1200 |
| air entraining agent | 100-200 |
| diatomaceous earth | 25-75 |
| quick dispersing thixiotropic | 25-75 |

-continued

| Material | Parts by Weight |
|---|---|
| suspending agent | |
| bentonite thickening agent | 10-35 |
| dispersant | 10-35. |

6. An additive for a pumpable backfill grout consisting essentially of

| Material | Parts by Weight |
|---|---|
| smooth surfaced vesicular expanded perlite | 500-1200 |
| air entraining agent | 100-200 |
| diatomaceous earth | 25-75 |
| quick dispersing hydroxy ethyl cellulose thixiotropic suspending agent | 25-75 |
| bentonite thickening agent | 10-35 |
| calcium lignosulfonate | 10-35. |

7. A pumpable backfill grout comprising, parts by weight,

| | |
|---|---|
| portland cement | 60-300 |
| fly ash | 250-350 |
| fine aggregate | 2500-3000 |
| water | 400-700 |
| smooth surfaced vesicular expanded perlite | 3-15 |
| air entraining agent | .6-1.2 |
| diatomaceous earth | .15-.45 |
| quick dispensing thixiotropic suspending agent | .15-.45 |
| bentonite thickening agent | .06-.2 |
| dispersant | .06-.2. |

8. A pumpable backfill grout consisting essentially of, parts by weight,

| | |
|---|---|
| portland cement | 60-300 |
| fly ash | 250-350 |
| fine aggregate | 2500-3000 |
| water | 400-700 |
| smooth surfaced vesicular expanded perlite | 3-15 |
| air entraining agent | .6-1.2 |
| diatomaceous earth | .15-.45 |
| quick dispersing hydroxyethyl cellulose thixiotropic suspending agent | .15-.45 |
| bentonite thickening agent | .06-.2 |
| caclium lignosulfonate dispersant | .06-.2. |

* * * * *